US011956388B2

(12) United States Patent
Gustof et al.

(10) Patent No.: US 11,956,388 B2
(45) Date of Patent: Apr. 9, 2024

(54) METHOD AND DEVICE FOR EVALUATING THE EXPERTISE OF PARTICIPANTS DURING A GROUP CALL

(71) Applicant: MOTOROLA SOLUTIONS, INC., Chicago, IL (US)

(72) Inventors: Grzegorz Gustof, Myslenice (PL); Stefan Koprowski, Myslenice (PL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 18/000,144

(22) PCT Filed: Sep. 30, 2020

(86) PCT No.: PCT/PL2020/050071
§ 371 (c)(1),
(2) Date: Nov. 29, 2022

(87) PCT Pub. No.: WO2022/071814
PCT Pub. Date: Apr. 7, 2022

(65) Prior Publication Data
US 2023/0247143 A1    Aug. 3, 2023

(51) Int. Cl.
*H04M 3/56* (2006.01)
*G10L 15/18* (2013.01)
*G10L 25/51* (2013.01)

(52) U.S. Cl.
CPC ......... *H04M 3/567* (2013.01); *G10L 15/1815* (2013.01); *G10L 25/51* (2013.01); *H04M 2201/40* (2013.01)

(58) Field of Classification Search
CPC .............. H04M 3/567; H04M 2201/40; G10L 15/1815; G10L 25/51
(Continued)

(56) References Cited

U.S. PATENT DOCUMENTS 8,127,236 B2   2/2012   Hamilton et al.
8,751,559 B2   6/2014   Richardson et al.
(Continued)

FOREIGN PATENT DOCUMENTS

EP    3616619 A1    3/2020

OTHER PUBLICATIONS

The International Search Report and the Written Opinion corresponding patent application No. PCT/PL2020/050071 filed: Sep. 30, 2020, all pages.

*Primary Examiner* — Thjuan K Addy
(74) *Attorney, Agent, or Firm* — Raguraman Kumaresan

(57) ABSTRACT

A process of evaluating the expertise of participants during a group call. In operation, an electronic computing device analyzes speech content of participants on a group call to determine a call context associated with the group call. The electronic computing device then assigns an expected expertise score for the participant by correlating the call context with a participant profile and further determines a demonstrated expertise score for the participant as a function of the expected expertise score and a call participation score indicating a duration of time that the participant has spoken during the group call. When the electronic computing device detects that a decision is being made with respect to the call context, the electronic computing device provides a visual or audio output on a corresponding visual or audio output device indicating the demonstrated expertise score of at least one of the participants.

20 Claims, 6 Drawing Sheets

(58) Field of Classification Search
USPC ............ 379/202.01, 201.01, 201.02, 201.07, 379/201.08, 203.01, 88.01, 67.1
See application file for complete search history.

(56) References Cited

U.S. PATENT DOCUMENTS

| | | |
|---|---|---|
| 9,191,218 B1 | 11/2015 | Rehder et al. |
| 9,426,421 B2 | 8/2016 | Balasaygun et al. |
| 9,600,274 B2 | 3/2017 | Briggs et al. |
| 10,541,824 B2 | 1/2020 | Badar-Natal et al. |
| 11,145,295 B1 * | 10/2021 | Kurhekar ................ G10L 13/00 |
| 2017/0316326 A1 | 11/2017 | Ricketts et al. |
| 2019/0014602 A1 | 1/2019 | Gan et al. |
| 2019/0188582 A1 | 6/2019 | Kephart et al. |

* cited by examiner

| TIME | EXPECTED EXPERTISE SCORE | | | DEMONSTRATED EXPERTISE SCORE | | | GROUP EXPERTISE SCORE | LOWER THAN THRESHOLD (1.5)? |
|---|---|---|---|---|---|---|---|---|
| | F1 | F2 | BM | F1 | F2 | BM | | |
| T0 | 2 | 4 | 10 | 0 | 0 | 0 | 0 | YES |
| T1 | 2 | 4 | 5 | 0.1 | 0.2 | 0.7 | 1 | YES |
| T2 | 2 | 4 | -2 | 0.3 | 0.5 | -1.8 | -1 | YES |
| T3 | 2 | 6 | -2 | 0.6 | 3 | -2 | 1.6 | NO |

FIG. 5

METHOD AND DEVICE FOR EVALUATING THE EXPERTISE OF PARTICIPANTS DURING A GROUP CALL

BACKGROUND

During a group call, it may be hard for some people to join the discussion and express their opinion. Some people may feel uncomfortable expressing their opinion because they do not want to contradict an opinion shared by another person in the group call or because they are not confident of their own opinion. Some people may tend to feel uncomfortable speaking to a large number of people on the call. Also, not everyone in the call gets an equal opportunity to speak during the call. In addition, there are technical limitations in group calls such as half-duplex calls where a user can communicate on the group call only after being granted a floor. In group calls, floor is often granted on a priority basis to participants, for example, based on their rank or role. So, in half-duplex calls, not everyone may get a floor to transmit during the call. While the above issues may not present a major problem in a call established for casual conversations, it is important to address some of the above issues in group calls that are particularly established to make key decisions for responding to an emergency situation.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

FIG. 5 illustrates an example database that is maintained at an electronic computing device for tracking the expertise of participants at different time points during a group call in accordance with some embodiments.

Figure 1:
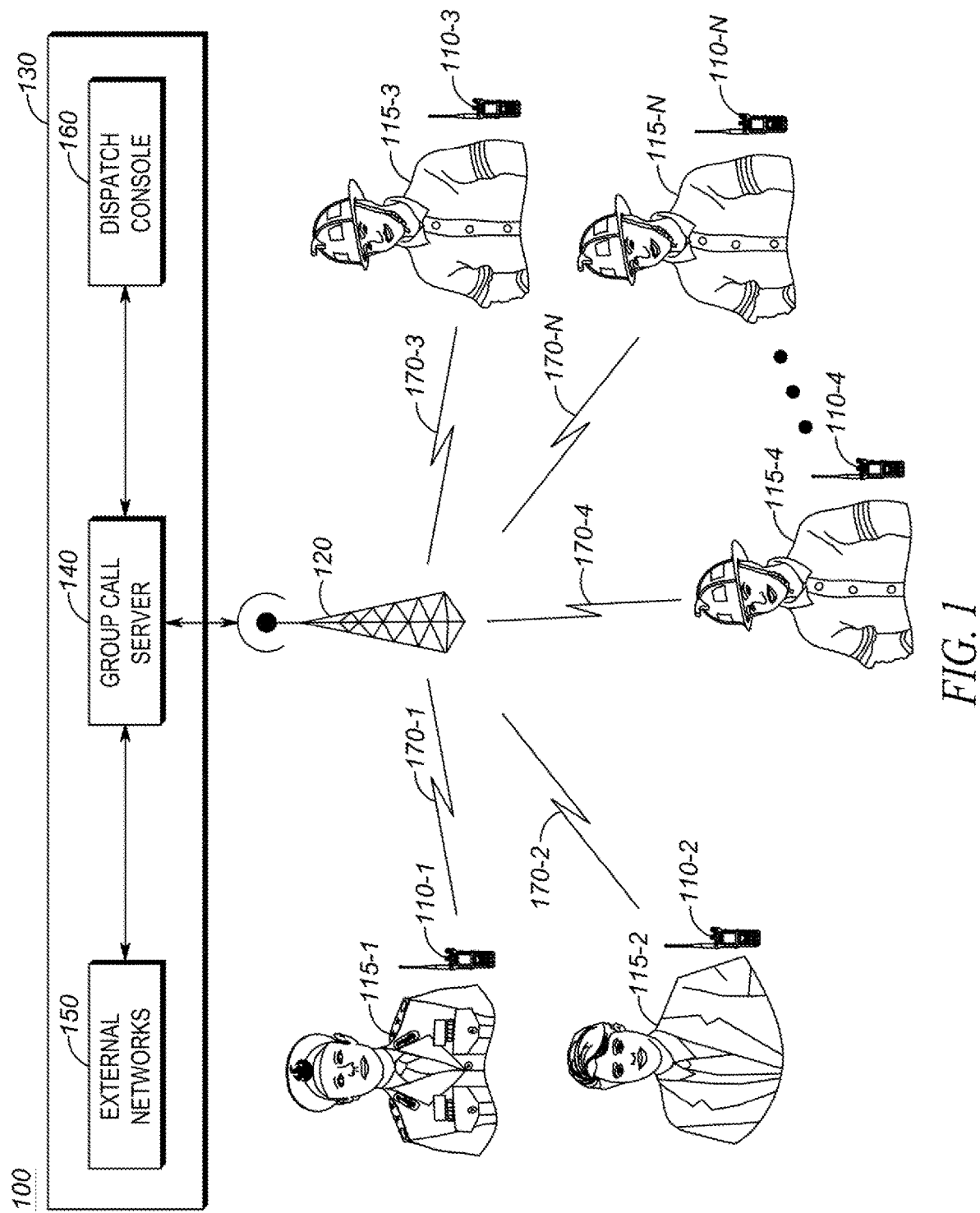
FIG. 1 is a block diagram of a communication system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

As described above, human and technical limitations may possibly cause errors in key decisions taken during a group call. For example, in case of a public-safety incident such as a fire incident in a building, a group call may be established between firemen, building managers, and other first responders. A fire commander may need to make a key decision regarding the door that should be used by firemen to enter the building and respond to the fire situation in the building. Fire commander can make a better decision if everyone with relevant expertise participates in the conversation and also shares accurate information, for example, regarding the nature of the fire, layout of the building, current occupants of the building, etc. As an example, the fire commander may request the participants of the call for information regarding the layout of the building in order to choose a safe passage for the firefighters. In this case, it is important for the fire commander to receive accurate information from those participants in the group call with relevant expertise or knowledge regarding the layout of the building. However, not every participant in the call may provide accurate information and further a participant in the call with the most relevant expertise regarding the building layout may not have spoken during the call. Moreover, when a group call is established between participants selected across multiple agencies (e.g., fire department, medical department, building personnel, etc.), participants may not know each other and therefore may not be comfortable sharing information with other participants. Alternatively, participants may assume that other participants, for example, a building manager would be more knowledgeable about the building and therefore any information shared by the building manager about the building would be accurate as well. However, when information received from the building manager is inaccurate, it is possible for the fire commander to make a wrong decision regarding the door that should be used by the firemen to enter the building. These limitations can be addressed by technologically evaluating the expertise that should be expected from the participants as well as the expertise actually demonstrated by the participants during a call. Described below is an improved technical process that evaluates the expertise of the participants during a group call.

One embodiment provides a method of evaluating the expertise of participants during a group call. The method comprises: analyzing, at an electronic computing device, via a natural language processing engine, speech content transmitted between communication devices of participants on a group call to determine a call context associated with the group call; obtaining, at the electronic computing device, a participant profile corresponding to each of the participants on the group call; assigning, at the electronic computing device, for each of the participants, an expected expertise score by correlating the call context with the participant profile; assigning, at the electronic computing device, for each of the participants, a call participation score based on a duration of time that the participant has spoken during the group call; determining, at the electronic computing device, for each of the participants, a demonstrated expertise score as a function of the expected expertise score and the call participation score of the participants; and detecting, at the electronic computing device, based on analyzing the speech content via the natural language processing engine, that a decision is being made with respect to the call context, and responsively providing a visual or audio output on a corresponding visual or audio output device indicating the demonstrated expertise score of at least one of the participants.

Another embodiment provides an electronic computing device comprising a transceiver and an electronic processor communicatively coupled to the transceiver. The electronic processor is configured to: analyze, via a natural language processing engine, speech content transmitted between communication devices of participants on a group call to determine a call context associated with the group call; obtain a participant profile corresponding to each of the participants on the group call; assign, for each of the participants, an expected expertise score by correlating the call context with the participant profile; assign, for each of the participants, a call participation score based on a duration of time that the participant has spoken during the group call; determine, for each of the participants, a demonstrated expertise score as a function of the expected expertise score and the call participation score of the participant; and detect, based on analyzing the speech content via the natural language processing engine, that a decision is being made with respect to the call context, and responsively provide, via the transceiver, a visual or audio output on a corresponding visual or audio output device indicating the demonstrated expertise score of at least one of the participants.

Each of the above-mentioned embodiments will be discussed in more detail below, starting with example system and device architectures of the system in which the embodiments may be practiced, followed by an illustration of processing blocks for achieving an improved technical method, device, and system for method of evaluating the expertise of participants during a group call. Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

Further advantages and features consistent with this disclosure will be set forth in the following detailed description, with reference to the figures.

Referring now to the drawings, and in particular FIG. 1, a communication system 100 is shown including a plurality of communication devices 110-1 through 110-*n*, a base station 120, and an infrastructure radio access network (RAN) 130 including a group call server 140, external networks 150, and a dispatch console 160. The plurality of communication devices 110-1 through 110-*n* can be interchangeably referred to, collectively, as communication devices 110, and generically as a communication device 110. The communication device 110 may be associated with or subscribed to one or more talk groups to participate in group calls. The communication devices 110-1 through 110-*n* may be operated by respective users 115-1 through 115-*n* (for example, a public-safety responder), generically referred to as user(s) 115 or participant(s) 115. The users 115 may carry or wear the respective communication devices 110, such as a battery-powered portable radio used for narrowband and/or broadband direct-mode or infrastructure communications, a battery-powered radio speaker microphone (RSM) video capture device, and vehicular radios. Each communication device 110 may include one or more wireless communication interfaces for communicating with a base station 120 and/or directly with one or more other communication devices 110 in the system 100.

The base station 120 and infrastructure RAN 130 works in tandem to provide infrastructure wireless communication services to communication devices 110 that are within a wireless transmission range of the base station 120. While infrastructure RAN 130 is illustrated in FIG. 1 as including a group call server 140, external networks 150, and a dispatch console 160, in other embodiments, RAN infrastructures may contain a subset of such components or may contain a superset of such components. For example, infrastructure RAN 130 may include one or more elements such as additional base stations, base station controllers, router, switches, gateways, and the like, arranged, connected, and programmed to provide wireless service to communication devices 110. The communication system 100 could take the form of a public-safety radio network or commercial broadband network.

The group call server 140 may be, for example, a radio controller, push-to-talk (PTT) server, zone controller, mobile management entity (MME), base station controller (BSC), mobile switching center, site controller, call controller, or other network device. While the group call server 140 is illustrated as a separate entity in the system 100, the group call server 140 may be integrated with other devices (such as a zone controller) in the infrastructure RAN 130 and/or within BS 120. The group call server 140 may be configured to provide registration, authentication, encryption, routing, and/or other services to communication devices 110 operating within the coverage area of the base station 120, in addition to further features and functions disclosed herein. The group call server 140 additionally tracks or has access to group subscription information. The group subscription information identifies each group (also referred to as a talk group) by a unique group identifier. Each group is associated with a plurality of call participants. Each call participant is identified by a unique identifier associated with a communication device 110 and/or a user 115 operating the communication device 110. For example, a participant associated with the group call may be identified by a device identifier (ID) such as a hardware ID, hardware Media Access Control (MAC) address, Internet Protocol (IP) address, radio ID, International Mobile Subscriber Identity (IMSI), a serial number, user name, user ID, or some other unique identifier that can be used to identify subscribed participant communication devices 110 or users 115.

The communication device 110 and/or user 115 operating the communication device 110 may be referred herein as a 'participant' or a "call participant." For example, the user 115 may be interchangeably referred to as a "participant" when the group call server 140 identifies a particular call participant by the user identifier. While the term "group call" is used in this description, it will be understood by those of skill in the art that a term such as "communication group" or "talk group" could be used instead, and that the media data being exchanged during a group call among the participants on the group call could be any suitable type of data, such as combination of one or more of voice data, image data, video data, and the like. Further, the term "group" is used in this disclosure to refer to a particular group of communications devices 110 that are participating in a group call.

In one embodiment, each communication device 110 includes a push-to-talk (PTT) key or button that when depressed by the user 115 causes the corresponding communication device 110 to send a signal to the group call server 140 to request allocation of communication resources for enabling the communication device 110 to transmit communications to other participants participating in a group call. A soft push-to-talk (PTT) input may also be provided for this purpose, for example, via a touch interface on a display screen of the communication device 110.

In accordance with some embodiments, the group call server 140 controls allocation of communication resources (i.e., frequency channels) required to establish a group call between participants. In accordance with embodiments, an electronic computing device is implemented at the group call server 140 or another entity within the communication system 100 to evaluate the expertise of participants during a group call. In these embodiments, the electronic computing device employs a natural language processing (NLP) engine to analyze speech content transmitted between communication devices 110 of participants on the group call and determine a call context associated with the group call. The electronic computing device also obtains access to a participant profile (e.g., knowledge, skill level, rank, role etc.,) of the participants on the group call. The electronic computing device assigns an expected expertise score for each participant on the group call by correlating the call context with the participant profile. The electronic computing device may further update (either lower or increase) the expected expertise score for each participant by validating respective speech content of the participants against a corresponding verified content (e.g., incident information received from a trusted source) that may be stored locally or remotely in one or more databases (not shown). The electronic computing device also assigns a call participation score based on a duration of time that the participant has spoken during the group call. The electronic computing device then determines a demonstrated expertise score for each of the participants as a function of the expected expertise score and the call participation score of the participants. When the electronic computing device detects, based on analyzing the speech content via the natural language processing engine, that a decision is being made or about to be made with respect to the call context, the electronic computing device may provide a visual or audio output on a corresponding visual or audio output device (e.g., on a communication device 110 associated with a participant authorized to make a decision in relation to assigning a task for responding to an incident) indicating the demonstrated expertise score of one or more of the participants. For example, the electronic computing device may alert a participant (e.g., a high-ranking participant such as a fire commander authorized to make a decision with respect to a fire incident) that the demonstrated expertise score of one or more participants in the group call is less than a threshold. This may provide an indication to the high-ranking participant that decision-making should be postponed (i.e. to obtain more information in relation to the call context) until the participants with demonstrated expertise scores lower than the threshold, are provided opportunity to speak (e.g., by granting a talk group floor) during the group call. In some embodiments, the electronic computing device calculates a group expertise score of all the participants on the group call based on aggregating the demonstrated expertise score of each of the participants on the group call. In these embodiments, if the electronic computing device determines that a decision is being made with respect to the call context at the time when the group expertise score is lower than a group expertise score threshold, then the electronic computing device provides a visual or audio output (e.g., on a communication device of a high-ranking participant) indicating the group expertise is lower than the threshold. In response to this output, the high-ranking participant may postpone making a decision until the high-ranking participant receives a further communication (e.g., via a private call) from the electronic computing device indicating that the group expertise score is equal to or greater than the group expertise threshold.

In accordance with some embodiments, the group call server 140 is configured to permit only one participant (i.e., via a communication device 110 associated with the talk group participant) to transmit and/or be heard by other participants (i.e., via their respective communication devices 110) during a group call. In these embodiments, when a particular participant signals, for example, via a push-to-talk (PTT) input, to transmit during a group call, the group call server 140 checks if any other participant is currently transmitting during the group call. If no participant is transmitting, the group call server 140 may transmit a signal to the participant of the talk group indicating that a floor is granted (e.g., allocation of a voice channel) to the requesting participant. The group call server 140 may prioritize assignment of floor grant to particular one of the participants based on role, rank, or expertise of the participants. In some embodiments, the group call server 140 may adjust the priority with which floor grant is assigned to a participant in accordance with a group expertise score that is determined based on an aggregation of demonstrated expertise scores of all participants in the group call. For example, the group call server 140 may prioritize the assignment of floor grant for a particular participant when the particular participant's call participation score is the lowest among all the participants during the group call and further when the expected expertise score is the highest among all the participants during the group call.

External networks 150 may be made accessible to communication devices 110 via infrastructure RAN 130. External networks 150 may include, for example, a public switched telephone network (PSTN), a plain old telephone (POT) system, a wide-area packet-switched network such as the Internet, or another wired or wireless service provider's network, among other possibilities.

Dispatch console 160 may be directly coupled to the group call server 140, as shown, or may be indirectly coupled to the group call server 140 via one or more internal or external networks. The dispatch console 160 allows an administrator or dispatcher at the dispatch console 160 to initiate infrastructure-sourced group communications to group call participants, among other features and functions. In accordance with some embodiments, the dispatch console 160 may also be added to one or more talk groups as a participant of the talk groups, to transmit and/or listen to communications on the talk groups. In one embodiment, the dispatch console 160 receives a notification of occurrence of an incident (e.g., a fire incident in a building) and may transmit information associated with the incident to communication devices 110 associated with users 115, for example, particular users assigned to the public safety responder role. In accordance with some embodiments, the dispatch console 160 may assign first responders to respond to the incident and further instruct the group call server 140 to set up a group call among the first responders assigned to the incidents. The dispatch console 160 may also select additional participants for the group call. For example, in case of a fire incident in a building, a dispatcher may, via the dispatch console 160, select officers employed in the building (e.g., a building manager) to be added to the group call. The dispatch console 160 may also provide to the group call server 140, a participant profile corresponding to each of the participants who are to be added to the group call. In accordance with some embodiments, the dispatch console 160 also obtains information corresponding to the incident (e.g., fire incident) and may either transmit the obtained information to the group call server 140 and/or provide access to a database from which the group call server 140 can access it. An electronic computing device, for example, implemented at the group call server 140, may maintain incident information locally or remotely in a database to validate the speech content received from the participants on the group call and to further evaluate the expertise/knowledge of the participants during the group call. For example, the electronic computing device may assign an expected expertise for each participant in the group call based on information contained in the participant profile and the call context extracted based on the conversations in the group call. If the information shared by the participant is not consistent or otherwise conflicts with the incident information, then the electronic computing device may lower the expected expertise score of the participants.

Infrastructure RAN 130 and base station 120 may implement one or more radio access technologies (RATs) and may communicate with communication devices 110 over respective air-interface links 170-1 through 170-n (collectively referred to as air-interface link or links 170) according to the one or more RATs. Example RATs include a direct-mode, conventional, or infrastructure-mode trunked land-mobile-radio (LMR) standard or protocol such as European Telecommunications Standards Institute (ETSI) Digital Mobile Radio (DMR), a Project 25 (P25) standard defined by the Association of Public Safety Communications Officials International (APCO), Terrestrial Trunked Radio (TETRA), or other LMR radio protocols or standards. In other embodiments, RATs operate in accordance with standard and/or protocols such as Long Term Evolution (LTE), LTE-Advance, or 5G protocol including multimedia broadcast multicast services (MBMS) or single site point-to-multipoint (SC-PTM) over which an open mobile alliance (OMA) push to talk (PTT) over cellular (OMA-PoC), a voice over IP (VoW), an LTE Direct or LTE Device to Device, or a PTT over IP (PoW) application. While FIG. 1 illustrates an example in which all communication devices 110 use a same RAT, in other embodiments, each communication device or set of communication devices may use different RATs to communicate with one or more same or different infrastructure RAN.

Downlink communications over air-interface links 170 may be addressed to communication devices 110 (e.g., multicast or broadcast using an identifier, such as a Subscriber Group ID (SGID), that is associated with a talk group), and/or to one or more single communication devices (e.g., unicast using an identifier, such as a Subscriber Unit Identifier (SUID), that is uniquely associated with that communication device), among other possibilities that are known to those of skill in the art.

In addition to infrastructure wireless air-interface links 170 communicatively coupling the communication devices 110 to the infrastructure RAN 130 via the base station 120, communication devices 110 may also maintain ad-hoc or direct-mode ("ad-hoc") air-interface links 170 without any intervening infrastructure between them. For example, the communication device 110-1 may be wirelessly coupled to communication device 110-2 via a direct-mode air interface link (not shown) in accordance with one or more direct-mode air-interface protocols, such as Bluetooth, near field communication (NFC), Infrared Data Association (IrDA), ZigBee, direct-mode land-mobile-radio (LMR), and/or Wi-Fi, as long as the devices are within mutual transmission range of one another.

Figure 2:
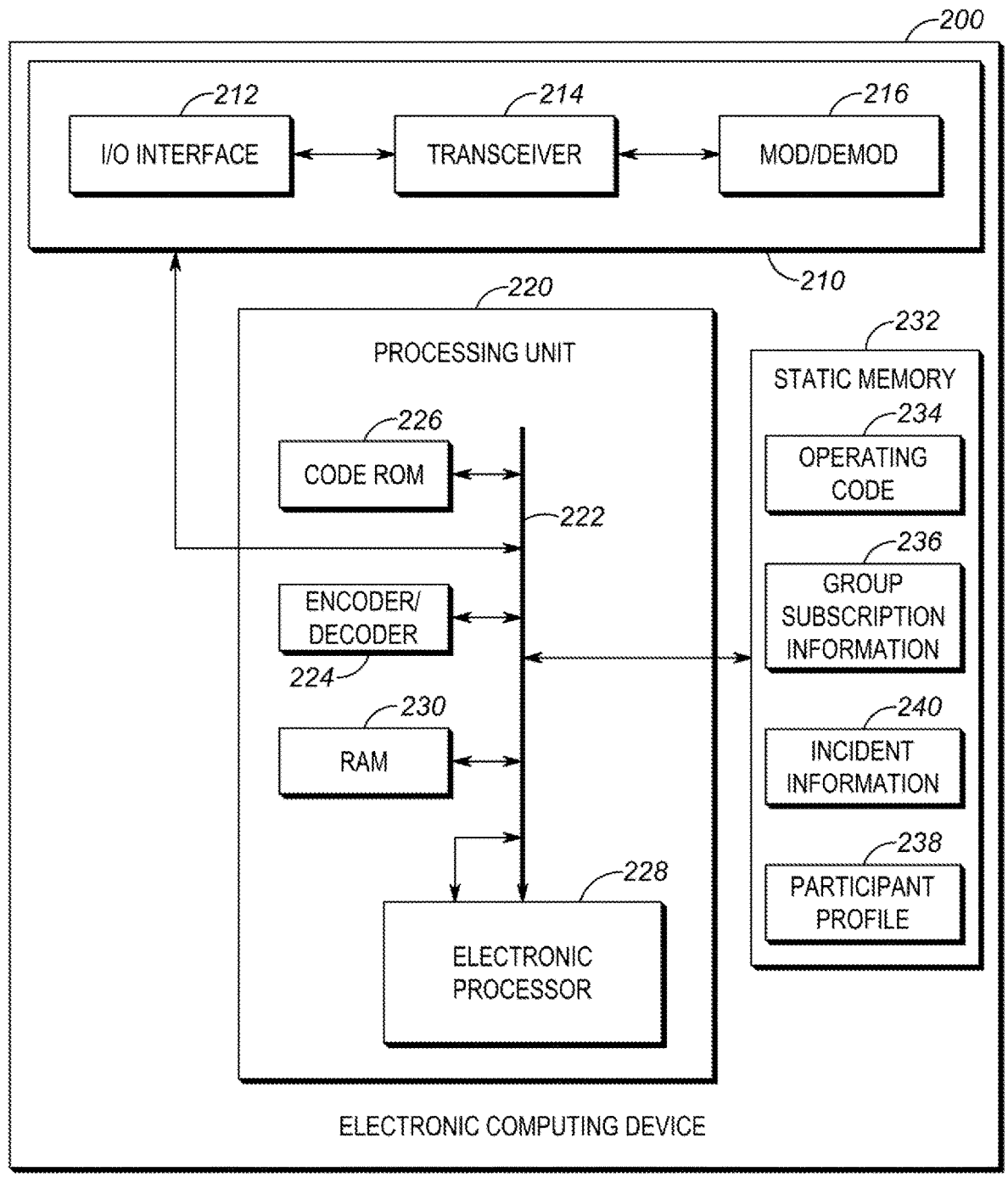
FIG. 2 is a block diagram of an electronic computing device shown in FIG. 1 in accordance with some embodiments.

Now referring to FIG. 2, a schematic diagram illustrates an electronic computing device 200 according to some embodiments of the present disclosure. The electronic computing device 200 may be embodied in the group call server 140, or dispatch console 160, or another computing device in the infrastructure RAN 130 shown in FIG. 1. In one embodiment, the electronic computing device 200 may be implemented as a distributed computing device across two or more of the foregoing (or multiple of the same type of one of the foregoing) and linked via a wired and/or wireless communication link(s). While FIG. 2 may represent the devices as described above with respect to FIG. 1, depending on the type of the device, the electronic computing device 200 may include fewer or additional components in configurations different from that illustrated in FIG. 2.

As shown in FIG. 2, the electronic computing device 200 includes a communications unit 210 that is coupled to a common data and address bus 222 of the processing unit 220. The communications unit 210 may include one or more wired or wireless input/output (I/O) interfaces 212 that are configurable to communicate with communication devices 110, base station 120, and/or with other devices in or communicably coupled to the system 100. The communications unit 210 may include one or more wireless transceivers 214, such as a DMR transceiver, a P25 transceiver, a Bluetooth transceiver, a Wi-Fi transceiver perhaps operating in accordance with an IEEE 802.11 standard (e.g., 802.11a, 802.11b, 802.11g), a WiMAX transceiver perhaps operating in accordance with an IEEE 802.16 standard, an LTE transceiver, and/or other similar type of wireless transceiver configurable to communicate via a wireless radio network. The communications unit 210 may additionally include one or more wireline transceivers 214, such as an Ethernet transceiver, a Universal Serial Bus (USB) transceiver, or similar transceiver configurable to communicate via a twisted pair wire, a coaxial cable, a fiber-optic link or a similar physical connection to a wireline network. The transceiver 214 is also coupled to a combined modulator/demodulator 216 that is coupled to an encoder/decoder 224 of the processing unit 220.

The processing unit 220 may include the encoder/decoder 224 with an associated code Read Only Memory (ROM) 226 for storing data for initializing system components, and encoding and/or decoding voice, data, control, or other signals that may be transmitted or received between the group call server 140 and communication devices 110 in the system 100. The processing unit 220 includes an electronic processor 228 coupled, by the common data and address bus 222, to the encoder/decoder 224, a Random Access Memory (RAM) 230, and a static memory 232.

Static memory 232 may comprise, for example, a hard-disk drive (HDD), an optical disk drive such as a compact disk (CD) drive or digital versatile disk (DVD) drive, a solid state drive (SSD), a tape drive, a flash memory drive, or a tape drive, to name a few. Static memory 232 stores operating code 234 for the electronic processor 228 that, when executed, performs one or more of the functions set forth in FIGS. 3-5 and accompanying text.

Static memory 232 may store (or electronic computing device 200 has access to, via communications unit 210) permanently or temporarily, group subscription information 236 that, for each group identifier (i.e., a unique identifier assigned to each talk group) associated with a particular group of participants, identifies communication devices 110 and/or users 115 that are participants of the particular group.

In accordance with embodiments, the electronic computing device 200 further has access to or stores participant profile 238 locally at the static memory 232 for each of the call participants. The participant profile 238 associated with each participant includes information related to one or more of: a device identifier of the communication device 110 corresponding to the call participant, an user identifier of the user 115 of the communication device 110, a group identifier with which the call participant is currently associated, an agency (e.g., fire department, police department, medical department etc.,) to which the participant is affiliated, rank, experience, and/or role of the participant, a current location of the user 115 and/or communication device 110, historical talk group conversations (i.e., recorded conversations) associated with the participant, knowledge data (e.g., skill level, knowledge, or education level of the user) of the user, current presence status, and sensor data (e.g., such as an indication of a gun being removed from holster, heart rate, ambient audio data, environmental data etc.,) corresponding to the participant.

Static memory 232 may further store (or electronic computing device 200 has access to, via communications unit 210) incident information 240 corresponding to one or more incidents assigned to talk group participants identified in the group subscription information 236. The incident information 240 may include one or more of: incident identifier, incident severity, incident type, incident location, time elapsed since the incident has been reported, and number of mobilized assets (e.g., first responders) assigned to respond to an incident. The incident information 240 may also further include supplementary information obtained from different trusted sources (including camera and other sensors deployed at the incident location) corresponding to the incident. The supplementary information may include verified content about the incident or the incident location. For example, in case of a fire incident, the supplementary information may include a floor plan/layout of the building, no. of people estimated to be currently present in different regions of the building, location of fire extinguishers, a video of the incident etc. In accordance with some embodiments, the electronic computing device 200 may assign an expected expertise score for each participant in the group call based on information contained in the participant profile 238 and call context extracted based on the conversations (i.e., speech content) in the group call. If the information shared by the participant is not consistent or otherwise conflicts with the incident information 240, then the electronic computing device 200 may lower the expected expertise of the participants.

In accordance with embodiments, the electronic computing device 200 further includes a natural language processing engine (not shown) configured to analyze audio signals of the monitored communication, i.e., speech content transmitted between the communication devices 110 of participants on the group call to determine a call context associated with the group call. The natural language processing engine may also include speech recognition systems that recognize (e.g., by converting speech content to text and then parsing the text) keywords in the speech content transmitted between the communication devices 110 of the participants. In accordance with some embodiments, the natural language processing engine is implemented using software instructions stored in the static memory 232 and executed by the electronic processor 228.

In examples set forth herein, the electronic computing device 200 is not a generic computing device, but a device specifically configured to evaluate the expertise of the participants during a group call. For example, in some embodiments, the electronic computing device 200 specifically comprises a computer executable engine configured to evaluate the expertise of participants during a group call.

Figure 3:
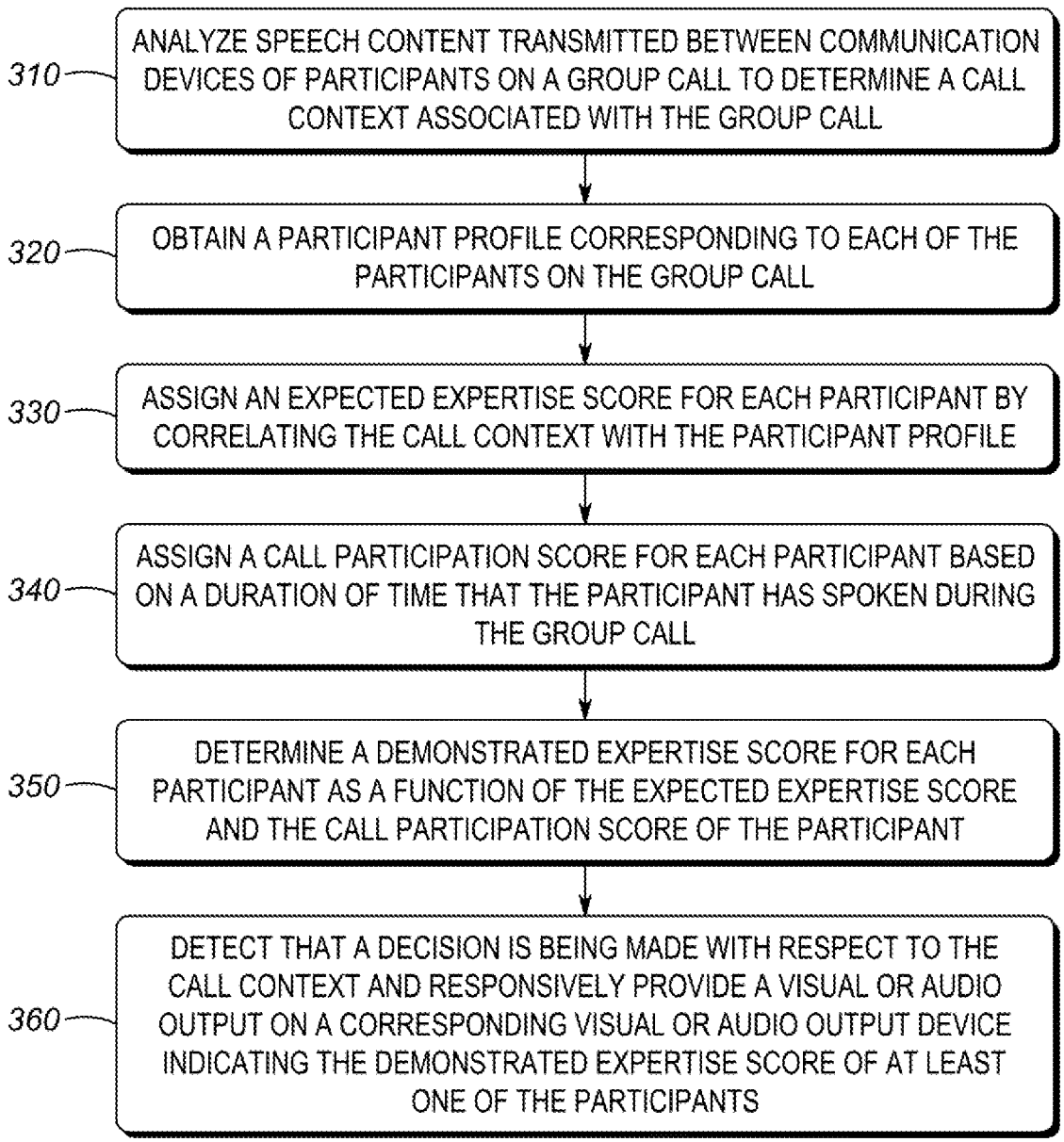
FIG. 3 illustrates a flowchart of a process of evaluating the expertise of participants during a group call.

Turning now to FIG. 3, a flowchart diagram in FIG. 3 illustrates a process 300 for evaluating the expertise of participants during a group call. While a particular order of processing steps, message receptions, and/or message transmissions is indicated in FIG. 3 as an example, timing and ordering of such steps, receptions, and transmissions may vary where appropriate without negating the purpose and advantages of the examples set forth in detail throughout the remainder of this disclosure. A corresponding electronic computing device, such as the electronic computing device 200 of FIG. 2, and embodied as a singular electronic computing device or distributed electronic computing device making up an electronic processing system as set forth earlier, may execute process 300. The electronic computing device 200 may execute the process 300 at power-on, at some predetermined periodic time period thereafter, in response to a trigger raised locally at the device via an internal process (e.g., in response to detecting that a group call is established between communication devices 110 of participants after an occurrence of an incident), or via an input interface (e.g., a user such as a dispatcher enabling a particular feature associated with the process 300 by activating a button at the dispatch console 160 and/or at the electronic computing device 200), among other possibilities.

The process 300 of FIG. 3 need not be performed in the exact sequence as shown and likewise various blocks may be performed in different order or alternatively in parallel rather than in sequence. Accordingly, the elements are referred to herein as "blocks" rather than "steps." The process 300 may be implemented on variations of the system 100 of FIG. 1 as well.

Process begins at block 310 where the electronic computing device 200 analyzes, via a natural language processing engine, speech content transmitted between communication devices 110 of participants on a group call to determine a call context associated with the group call. In one embodiment, the electronic computing device 200 begins monitoring the group call as soon as a transmission (i.e., speech content) is detected on a group call. The electronic computing device 200 may be simultaneously monitoring multiple group calls for the purposes of evaluating the expertise of the participants of the respective group calls. In another embodiment, the electronic computing device 200 begins monitoring the group call only when a group call is established in response to an occurrence of a particular incident, for example, based on a type and/or severity of an incident. For example, the electronic computing device 200 may receive a signal from the dispatch console 160 instructing the electronic computing device 200 to begin monitoring the group call for executing the process 300 of evaluating the expertise of the participants on the group call. The signal from the dispatch console 160 may include information such as group subscription information 236 (e.g., group identifier of the group call that needs to be monitored), participant profiles 238 of the participants on the group, and incident information 240 including an incident identifier (e.g., computer aided dispatch (CAD) identifier), type of incident, severity of incident, incident location, and incident supplementary information. The electronic computing device 200 may also obtain group subscription information 236, participant profile 238, and incident information 240 from other entities within the communication system 100.

In any case, when the electronic computing device 200 begins monitoring a particular group call, the electronic computing device 200 receives speech content transmitted between the communication devices 110 of the participants on the group call. The electronic computing device 200 then analyzes the speech content to determine a call context associated with the group call. In accordance with embodiments, the electronic computing device 200 employs a natural language processing engine to recognize keywords to determine a call context associated with the group call. For example, when the electronic computing device 200 has not yet received information about the incident for which the group call is established, the electronic computing device 200 may first identify a type of incident based on one or more general keywords (for example, "fire," "hostage," "robbery," and the like) detected from the speech content of the participants. The electronic computing device 200 may then determine a call context based on one or more specific keywords detected in relation to the type of incident previously identified based on analyzing the speech content of the call or based on incident information 240 stored in the static memory 232. For example, in relation to a "fire" incident, a participant with a role of the fire commander (e.g., user 115-1) may need to find a passage through which firefighters can enter a building to address the "fire" incident. In this case, the fire commander may be querying other participants to provide information about a floor plan or layout of the building. The electronic computing device 200 may then determine call context based on keywords such as "floor plan," "best route," "best passage," "door," etc., that are detected in the speech content transmitted on the group call, In other words, the electronic computing device 200 may determine that the fire commander may need to make a decision regarding a particular call context (e.g., "best route") determined based on keywords detected from the speech content transmitted between the communication devices 110 of the participants on the group call.

In some embodiments, the electronic computing device 200 may determine multiple call contexts based on speech content transmitted on the group call. For example, the electronic computing device 200 may first determine a call context based on a query (i.e., speech content) from a first participant (e.g., user 115-1 assigned to a role of a fire commander) regarding the "best route" or "floor plan" about the building. Subsequently, the electronic computing device 200 may determine a second call context based on another query from a second participant regarding the "address of the fire incident" (e.g., user 115-2 assigned to a role of a fireman). In this case, the electronic computing device 200 may separately determine and store two call contexts, for example, "best route" and "incident address" in order to evaluate the expertise of the participants of the group call as a function of the respectively determined call contexts in accordance with the process 300.

As shown in block 320, the electronic computing device 200 obtains a participant profile 238 corresponding to each of the participants on the group call. In one embodiment, the electronic computing device 200 may obtain the participant profile 238 from the group call server 140 or from the dispatch console 160. In another embodiment, the participant profile corresponding to the participants of the particular group call being monitored is extracted from the participant profile 238 pre-stored in the static memory 232. The participant profile 238 associated with each participant includes information related to one or more of: a device identifier of the communication device 110 corresponding to the call participant, an user identifier of the user 115 of the communication device 110, a group identifier with which the call participant is currently associated, an agency (e.g., fire department, police department, medical department etc.,) to which the participant is affiliated, rank, experience, and/or role of the participant, a current location of the user 115 and/or communication device 110, historical talk group conversations (i.e., recorded conversations) associated with the talk group participant, knowledge data (e.g., skill level, knowledge, or education level of the user) of the user, current presence status, and sensor data (e.g., such as an indication of a gun being removed from holster, heart rate, ambient audio data, environmental data etc.,) corresponding to the call participant.

Next, at block 330, the electronic computing device 200 assigns, for each participant in the group call, an expected expertise score by correlating the call context determined at block 310 with the participant profile obtained at block 320. In other words, the electronic computing device 200 determines a level of expertise that may be expected from the participant with respect to a particular subject matter (i.e., call context) being discussed on the call based on the participant profile 238 of the participant. In one embodiment, the expected expertise score may be assigned in terms of a number ranging between zero (0) to ten (10), with zero being the lowest expected expertise score and ten being the highest expected expertise score. As an example, when the call context is identified as "best route" in relation to the "fire" incident in a building, a participant with a participant profile indicating that the participant has knowledge or expertise on the floor plans of the building may be assigned a higher expected score than a participant with participant profile indicating that the participant has no knowledge or expertise about the floor plans of the building. Similarly, a participant with a participant profile indicating that the participant has never been to the building may be assigned a lower expected score than a participant with participant profile indicating that the participant is employed in the building or the participant has previously visited the building.

The expected expertise score of the participants may be updated each time the participant speaks in relation to the call context determined at block 310. The electronic computing device 200 updates the expected expertise score of each of the participants based on a validation of speech content respectively transmitted by each of the participants of the group call against verified content. For example, when a participant in the group call responds to a query from another participant in relation to the call context "best route," the electronic computing device 200 validates the speech content in the response against a corresponding verified content, for example, included in the incident information 240. During the validation, if it is determined that the participant's response is inconsistent (e.g., conflicts) with the verified content, then the electronic computing device 200 may lower the expected expertise score assigned to the participant. For example, assume that a building manager (e.g., user 115-2) having an expected expertise score of '10' speaks during the group call that the "best route" to a particular floor on a building is via "north door." In response, the electronic computing device 200 may determine, based on verified content received from a trusted source, that the "north door" indicated as the "best route" by the building manager is currently locked for entry. In this case, since the building manager's speech includes information that is inconsistent with the verified content, the electronic computing device 200 may lower the building manager's expected expertise score, for instance, from '10 to '5'. On the other hand, if it is determined that the participant's response is consistent (e.g., matches) with the verified content, then the electronic computing device 200 may increase the expected expertise score assigned to the participant. For example, assume that a fireman (e.g., user 115-3) having an expected expertise score of '4' speaks during the group call that the "best route" to a particular floor on a building is via "south door." In response, the electronic computing device 200 may determine, based on verified content received from a trusted source, that the "south door" indicated as "the best route" by the building manager is unlocked for entry. In this case, since the fireman's speech includes information that is consistent with the verified content, the electronic computing device 200 may increase the fireman's expected expertise score, for instance, from '4' to '6'. In these embodiments, the electronic computing device 200 is programmed to increase or decrease the expected expertise scores by a predetermined amount based on the validation of the respective speech content associated with the participants.

In another embodiment, the electronic computing device 200 may increase the expected expertise if the participant's response is consistent with the verified content, but may not lower the expected expertise score if the participant's response is inconsistent with the verified content. In yet another embodiment, the electronic computing device 200 may lower the expected expertise score if the participant's response is inconsistent with the verified content, but may not increase the expected expertise score if the participant's response is consistent with the verified content. In one embodiment, the participant's expected expertise score may not be increased beyond an upper limit (e.g., ten (10)) set for the expected expertise score or similarly may not be lowered beyond a lower limit (e.g., zero (0)) set for the expected expertise score. In another embodiment, the participant's expected expertise score may be increased beyond the upper limit (e.g., greater than ten (10)) and further may be decreased beyond the lower limit (e.g., a negative number, i.e., lower than zero (0)).

At block 340, the electronic computing device 200 assigns a call participation score for each participant on the call based on a duration of time that the respective participant has spoken during the call. In one embodiment, the electronic computing device 200 may calculate a duration of time spoken by a participant based on a floor time allocated to the participant by the group call server 140 to transmit during the group call. In another embodiment, the electronic computing device 200 may calculate a duration of time that the participant has actively spoken during the group call. In this embodiment, the electronic computing device 200 may include only those time periods during which there is active speech content transmitted from a participant on the group call for the purpose of calculating a duration of time that the participant has actively spoken during the group call. In yet another embodiment, the duration of time based on which the call participation score is assigned does not include a time period during which no speech content is transmitted from the communication device of the participant or a time period during which the speech content transmitted from the communication device 110 of the participant does not correlate with the determined call context. In this embodiment, the electronic computing device may further check if the speech content correlates with the call context determined at block 310. In case, the speech content does not correlate with the call context, the electronic computing device 200 may not include a corresponding time period (i.e., a time period in which the speech content does not correlate with the call context) in calculating a duration of time that the participant has actively spoken during the group call. For example, if the call context is "best route" in relation to a "fire" incident, but when a participant speaks about a different call context (e.g., another incident or a different subject matter), then the electronic computing device 200 may not include a time duration during which the participant spoke about different call context in calculating a call participation score. In other words, in this case, the electronic computing device 200 includes a time duration in calculating a call participation score only when the time duration corresponds to a user speech that correlates with the call context determined at block 310.

In one embodiment, the electronic computing device 200 may assign a participation score for a given participant based on a duration of time spoken by the given participant as well as a corresponding total duration of time spoken by all participants in the group call. For example, assume there are four participants in the call and that the electronic computing device 200 has detected that a first participant has spoken for 6 minutes, a second participant has spoken for 12 minutes, a third participant has spoken for 9 minutes, and a fourth participant has spoken for 3 minutes. The call participation score may be assigned in the range of zero (0) to ten (10), with zero indicating the lowest call participation score and ten being the highest call participation score. In the above example, the electronic computing device 200 may assign the first participant who spoke for '6' minutes with a call participation score of '2' (i.e., 20% of total duration (i.e., '30' minutes) of the call). The second participant who spoke for '12' minutes may be assigned a call participant score of '4' (i.e., 40% of total duration of the call). The third participant may be assigned a call participant score of '3' (i.e., 30% of total duration of the call). The fourth participant may be assigned a call participant score of '1' (i.e., 10% of total duration of the call). Alternatively, the call participation score may also be expressed using other indicators or numerical ranges (for example, 0 to 10, or 0 to 100%). In accordance with embodiments, the call participant score assigned to each participant is continuously updated as the call progresses and the duration of time spoken by each participant increases. It is possible that the call participation score for a particular participant may remain the same as the call progresses depending on the relative duration of time spoken by the participant when compared to the total duration of time spoken by all participants during the call.

At block 350, the electronic computing device 200 determines, for each of the participants, a demonstrated expertise score as a function of the expected expertise score and the call participation score of the participants. The expected expertise score may be the initial expected expertise score assigned to the participant based on the correlation of the call context with the participant profile 238 of the participant. Alternatively, the expected expertise score corresponds to an updated expected expertise score assigned to the participant based on the validation of the speech content of the participant against a corresponding verified content. In one embodiment, the demonstrated expertise score for a participant is calculated by multiplying the initial or updated expected expertise score with the call participation score. For example, when the initial expected expertise score of a given participant is '2' and call participant score of the given participant is "1," then the electronic computing device may compute the demonstrated expertise score of the given participant as '2' i.e., based on multiplying the initial expected expertise of '2' with the call participant score of '1'. In case, the initial expected expertise score of '2' for the given participant is lowered to '-2' because of the inaccurate information provided by a particular participant in response to a query from another participant, the electronic computing device 200 may compute the demonstrated expertise score based on the updated expected expertise score of '-2'. In this example, the electronic computing device 200 may compute the demonstrated expected expertise score as '-2' i.e., based on multiplying the updated expected expertise score of '-2' with the call participant score of '1'.

Next, at block 360, the electronic computing device 200 detects, based on analyzing the speech content via the natural language processing engine, that a decision is being made with respect to the call, and responsively provides a visual or audio output on a corresponding visual or audio output device indicating the demonstrated expertise score of at least one of the participants. In accordance with embodiments, the electronic computing device 200 employs natural language processing engine to analyze the speech content transmitted between the participants to detect if the speech content includes one or more predetermined keywords or commands (for example, "proceed," "execute," "complete," "perform," "enter," "evacuate," "go," etc.,) that are related to one or more tasks needed to be performed or assigned in relation to the call context (e.g., "best route") determined at block 310. In accordance with embodiments, the electronic computing device 200 detects that a participant with decision-making authority on the group call is about to make a decision (or has already made a decision) with respect to the call context (e.g., in relation to a particular task that needs to be performed to respond to the incident) determined based on analyzing the speech content transmitted between the communication devices 110 of the participants. When the electronic computing device 200 detects that a decision is being made with respect to the call context, the electronic computing device 200 may general a visual or audio output on a corresponding visual or audio output device (e.g., a communication device 110 of a particular participant with decision-making authority) indicating the demonstrated expertise score of one or more of the participants.

In accordance with some embodiments, the electronic computing device 200 determines a group expertise score of the participants on the group call based on aggregating the demonstrated expertise score of each of the participants. For instance, if there are three participants with demonstrated expertise scores of '0.6', '2', and '-2', the electronic computing device 200 may determine the group expertise score as '0.6' by summing the demonstrated expertise scores of the three participants. In one embodiment, the electronic computing device 200 does not include the demonstrated expertise score of one or more identified participants (e.g., a participant with decision-making authority, incident commander, dispatcher, etc.,) when calculating the group expertise score. In any case, the electronic computing device 200 then determines whether the group expertise score is lower than a group expertise score threshold in response to detecting that the decision is being made with respect to the call context. When the group expertise score is lower than the group expertise score threshold, the electronic computing device 200 provides an indication at communication devices 110 of one or more participants to continue with the conversation in the group call. For example, when the group expertise score of the participants on the group call is '0.6' and the group expertise score threshold is '1.5', the electronic computing device 200 may determine that the group expertise score is lower than the threshold. In this case, the electronic computing device 200 may identify a participant with a decision-making authority based on the participant profile 238 or alternatively based on analyzing the speech content of the participants. The electronic computing device 200 may then establish a private call with the communication device 110 of the identified participant to provide an alert indicating that the group expertise score is lower than the threshold and/or to continue with the conversation of the group call before making or finalizing the decision with respect to the call context. The electronic computing device 200 may also transmit a visual or audio output indicating the demonstrated expertise score of one or more of the participants to the communication device 110 of the identified participant (e.g., a participant with decision-making authority). In one example, the electronic computing device 200 may transmit a visual or audio output indicating an identification of all participants with demonstrated expertise scores lower than a demonstrated expertise score threshold to the communication device 110 of the identified participant.

In one embodiment, the electronic computing device 200 identifies a demonstrated expertise score of a particular one of the participants with the demonstrated expertise score lower than the demonstrated expertise score of all other participants. The electronic computing device 200 then provides a visual or audio output on a corresponding visual or audio output device (e.g., communication device 110) associated with the particular one of the participants indicating the demonstrated expertise score of the particular one of the participants. The electronic computing device 200 may alternatively identify a particular one of the participants with demonstrated expertise score higher than the demonstrated expertise scores of all the other participants. The electronic computing device 200 then provides a visual or audio output on a corresponding visual or audio output device (e.g., communication device) associated with the particular one of the participants indicating the demonstrated expertise score of the particular one of the participants. The electronic computing device 200 may also provide periodic notifications to a participant with the decision making authority or to each participant on the group call indicating one or more of the respective expected expertise scores, demonstrated expected scores, and the group expertise score.

In one embodiment, the electronic computing device 200 assigns a floor grant priority to each of the participants as a function of the expected expertise score or the demonstrated expertise score respectively associated with each of the participants. For instance, the electronic computing device 200 selects a particular one of the participants with the expected expertise score higher than the expected expertise scores of the other participants and further with the call participation score lower than the call participation scores of the other participants. The electronic computing device 200 may then assign a floor grant priority to the selected participant, such that the floor grant priority assigned to the selected participant is higher than the floor grant priorities respectively assigned to the other participants. Assigning a higher floor grant priority to a participant with high expected expertise score but a low call participation score allows a participant, who has not yet spoken or otherwise spoke for the least duration of time among all participants, to get floor time with higher priority to speak on the group call. Additionally, or alternatively, the electronic computing device 200 may also send a recommendation to a participant with decision-making authority (e.g., a fire commander) to provide opportunity to the selected participant to speak on the group call.

Figure 4A:
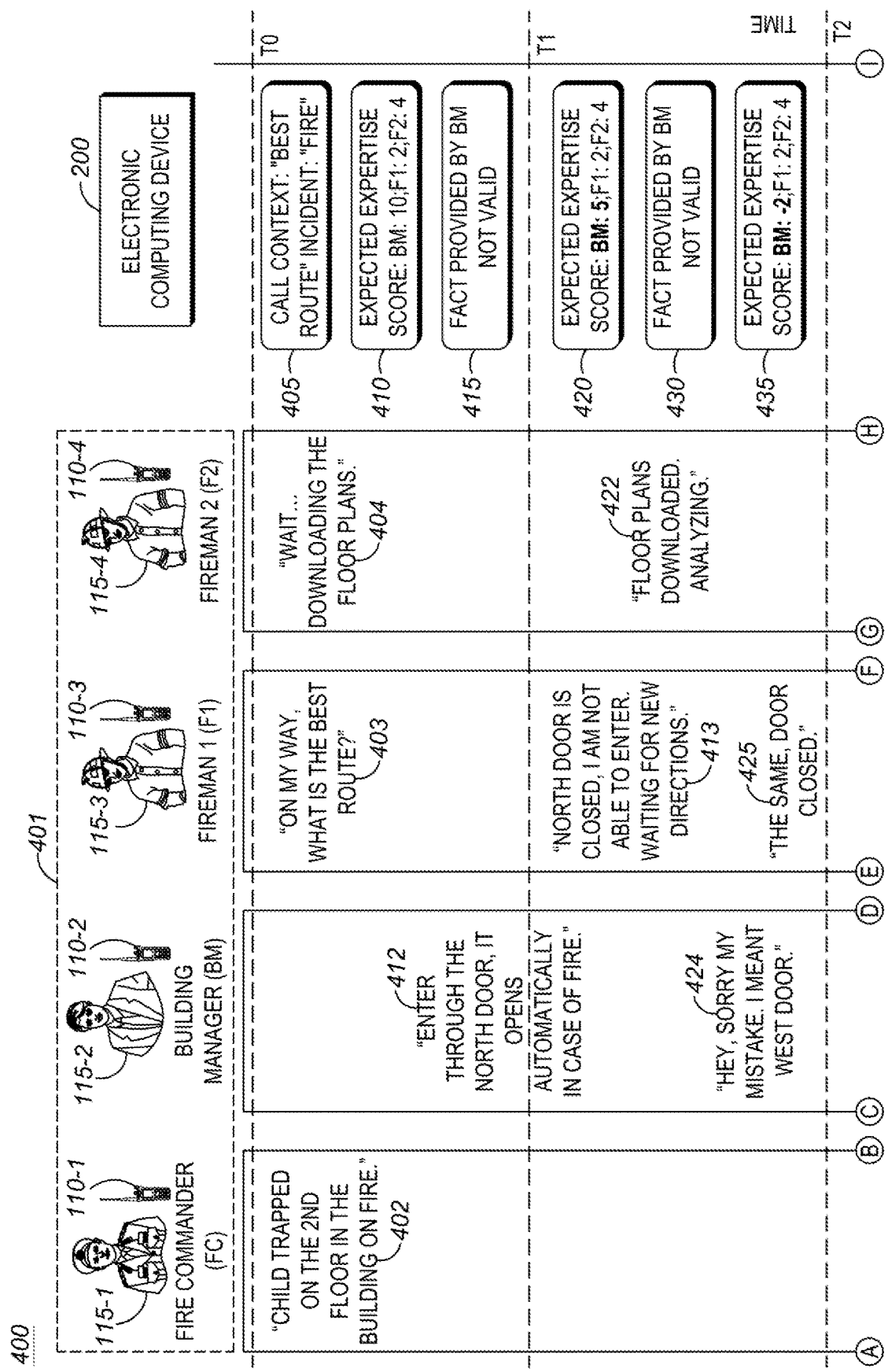
FIGS. 4A-4B illustrate an example scenario in which the process for evaluating the expertise of participants during a group call can be advantageously implemented in accordance with some embodiments.
Figure 4B:
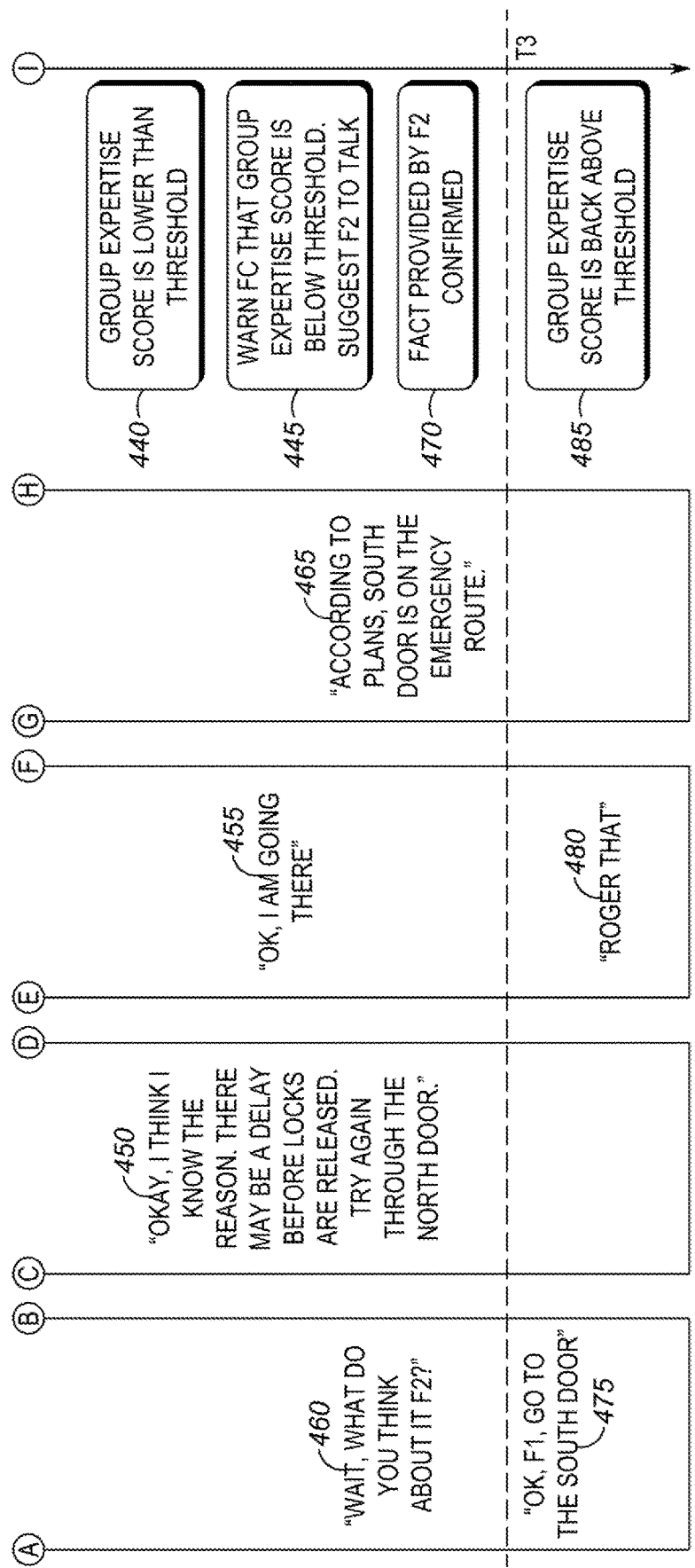

FIGS. 4A-4B illustrate an example scenario 400 in which the process 300 of evaluating the expertise of the participants during a group call can be advantageously implemented in accordance with some embodiments. In the example scenario, a talk group 401 is established between four participants in response to an occurrence of a fire incident reported at a building. The talk group 401 includes a first communication device 110-1 associated with a first participant assigned to a role of a fire commander (e.g. user 115-1), a second communication device 110-2 associated with a second participant assigned to a role of a building manager (e.g., user 115-2), a third communication device 110-3 associated with a third participant assigned to a role of a fireman (e.g., user 115-3), and a fourth communication device 110-4 associated with a fourth participant assigned to a role of a fireman (e.g., user 115-4). An electronic computing device 200 shown in FIG. 2 is implemented in accordance with embodiments to evaluate the expertise of the participants during a group call corresponding to the talk group 401. The electronic computing device 200 may begin monitoring the transmissions in the talk group 401 in response to receiving an instruction, for example, from a dispatch console 160 shown in FIG. 1. The electronic computing device 200 may automatically identify which one of the participants in the talk group 401 has a decision-making authority (e.g., with respect to making decisions such as assigning responders to particular incident-related tasks) by obtaining participant profiles 238 of the respective participants in the talk group 401. In the example scenario, the electronic computing device 200 may determine that the first participant assigned to the role of a fire commander 115-1 has decision-making authority in the talk group 401. In one embodiment, the electronic computing device 200 may also identify a participant with decision-making authority based on one or more keywords detected based on analysis of the speech content received from the participants in the talk group 401.

In accordance with embodiments, the electronic computing device 200 analyzes, via a natural language processing engine, speech content transmitted between communication devices 110 of participants in the talk group 401. In the example scenario 400, at time 'T0', the first participant (i.e. fire commander 115-1) reports (i.e., via speech 402) to the talk group 401 that a child is trapped on the 2nd floor of a building which is on fire. The electronic computing device 200 analyzes the speech 402 and may detect a keyword "fire" in the speech 402. In this example, the electronic computing device 200 may determine, based on the keyword "fire", that the type of incident is "fire." In response to fire commander's 115 speech 402, the third participant (i.e., fireman 115-3) responds "On my way, what is the best route" (i.e., via speech 403). The electronic computing device 200 analyzes the speech 403 and may detect a keyword "best route" in the speech 403. In the example, the electronic computing device 200 may update 405 the call context as "best route" based on the speech 403 received from the fireman 115-3. In other words, the electronic computing device 200 may determine, based on the intent and content of the speech 402, 403, that a decision may need to be made by the fire commander 115-1 regarding the subject matter (i.e., call context "best route") being discussed on the group call. Since the fire commander 115-1 needs to take a decision on the "best route" to enter the "2nd floor" of the building, the fire commander 115-1 would need some relevant information about the floor plan of the building. In the meantime, the fourth participant (i.e., fireman 115-4) responds to the fireman that he is "downloading the floor plans" (via speech 404).

In accordance with embodiments, the electronic computing device 200 determines an expected expertise score for each of the participants on the group call by correlating the call context "best route" with the participant profiles of the respective participants. The electronic computing device 200 may determine the expected expertise score based on multiple parameters (e.g., experience, role, rank, knowledge about the incident location, to name a few) associated with a participant profile 238. The electronic computing device 200 may apply different weights to different parameters associated with the participant profile 238 based on the call context. For example, with respect to the call context "best route," the electronic computing device 200 determines 410 that the building manager 115-2, fireman 115-3, and fireman 115-4 have an expected expertise score of '10', '2', '4', respectively. In this case, the building manager has a higher expected expertise score than the firemen 115-3, 115-4. This may be due to electronic computing device 200 weighing the "knowledge" factor (e.g., knowledge regarding the floor plans of the building) higher than, for example, an experience parameter (e.g., firefighting experience). The building manager's 115-2 knowledge of the building is expected to be at a higher level when compared to the firemen 115-3, 115-4.

In accordance with embodiments, the electronic computing device 200 updates the initial expected expertise scores assigned to the participants based on validation of speech received from the participants against a corresponding verified content, for example, incident information 240 acquired from a trusted source (e.g., surveillance camera). In the example scenario 400, the building manager 115-2 responds "Enter through the north door, it opens automatically in case of fire" (i.e., via speech 412) to the fireman's 115-3 query 403 regarding the "best route." However, the fireman 115-3 confirms that "North door is closed, I am not able to enter, waiting for new directions" (i.e., via speech 413). The electronic computing device 200 may determine 415 that the information provided by the building manager 115-2 in speech 412 is inconsistent with information acquired from the trusted source. Here, since the fireman 115-3 indicates in the speech 413 that the "north door" is closed, the electronic computing device 200 may lower the building manager's expected expertise score from '10' to '5'. In the meantime, the fireman 115-4 responds that the floor plans have been downloaded and he is in the process of analyzing the floor plans to determine the best route (i.e., via speech 422). At this point, the expected expertise scores of the building manager 115-2, fireman 115-3, fireman 115-3 are updated 420 as '5', '2', '4', respectively.

The electronic computing device 200 further determines 430 that the information in speech 424 received from the building manager 115-2 is again inconsistent with the information with a corresponding verified content (i.e., information in speech 425 received from the fireman 115-3). Accordingly, the electronic computing device 200 further lowers the expected expertise score of the building manager 115-2. At this point, at time 'T2', the expected expertise scores of the building manager 115-2, fireman 115-3, fireman 115-4 are updated 435 as '−2', '2', '4', respectively.

In accordance with embodiments, the electronic computing device 200 also determines a demonstrated expertise score for each participant as a function of the expected expertise score and a call participation score associated with the participant. Based on aggregating demonstrated expertise scores of the participants, the electronic computing device 200 continuously or periodically determines a group expertise score for the talk group 401. In some embodiments, the electronic computing device 200 also maintains a database in the static memory 232 to track the expertise scores at different time points during the call.

Briefly referring to FIG. 5, a database 500 maintained by the electronic computing device 200 for tracking the expertise scores of the participants at different time points during the call is shown. The database 500 includes a time field 510, an expected expertise score field 520, a demonstrated expertise score field 530, a group expertise score field 540, and a threshold compliance indicator field 550. The time field 510 identifies a time point (e.g., time elapsed since the group call is established) at which the different expertise scores are determined. The expected expertise score field 520 identifies an expected expertise score assigned to each of the participants in the call. In some embodiments, as shown in FIG. 5, the expertise score for a participant (e.g., fire commander 115-1) with a decision-making authority is not evaluated and therefore not included in the database 500. The demonstrated expertise score field 530 identifies a demonstrated expertise score determined by the electronic computing device 200 for each participant based on the corresponding expected expertise score and call participation score of the participant. The group expertise score field 540 identifies a group expertise score that is determined based on aggregating the demonstrated expertise score of the participants in the group call. The threshold compliance indicator field 550 indicates whether the group expertise score is lower than a group expertise score threshold. For example, the threshold compliance indicator field 550 may include an indicator 'YES' when the group expected expertise score is lower than a group expertise score threshold. On the other hand, the threshold compliance indicator field 550 may include an indicator 'NO' when the group expected expertise score is equal or greater than the group expertise score threshold. In accordance with some embodiments, the electronic computing device 200 may maintain multiple such databases 500 for simultaneously evaluating and tracking the expertise score of participants across multiple group calls.

Returning to FIGS. 4A-4B, and more particularly to FIG. 4B, at time 'T2' during the group call, the electronic computing device 200 determines 440 that the group expertise score is lower than a group expertise score threshold. In the example database 500 shown in FIG. 5, at time 'T2', the electronic computing device 200 computes the group expertise score as '−1' by summing the demonstrated expertise scores '−1.8', '0.3', '0.5' of the building manager 115-2, fireman 115-3, and fireman 115-4, respectively. In this example, since the group expertise score of '−1' is lower than a group expertise score threshold of '1.5', the electronic computing device 200 updates the threshold compliance indicator field 550 as 'YES' corresponding to time 'T2. Further, as shown in FIGS. 4A-4B, the electronic computing device 200 continues to monitor the speech 450, 455 received from the building manager 115-2 and fireman 115-3. As indicated by the low group expertise score, at this point in time 'T2', the fire commander 115-1 will most likely take a wrong decision regarding the "best route" to the "2nd floor" of the building. In this case, as indicated in the speech 455 received from the fireman 115-3, the fireman 115-3 will likely go to the wrong door unless he is commanded differently by the fire commander 115-1.

In the example scenario 400, since the electronic computing device 200 determines that the group expertise score is lower than the threshold, the electronic computing device 200 warns the fire commander 115-1 that the group expertise score at time 'T2' is lower than the threshold. For example, the electronic computing device 200 may transmit a notification 445 to the communication device 110-1 associated with the fire commander 115-1 indicating that the group expertise score is lower than the threshold. In addition, the electronic computing device 200 may include a suggestion in the notification 445 indicating that the fire commander 115-1 should seek information from a particular participant (e.g., a participant identified as having a higher demonstrated expertise score) in the talk group 401. In one embodiment, the electronic computing device 200 may join the talk group 401 as a participant and may further transmit in the talk group indicating that the group expertise score is lower than the threshold. In this example, the electronic computing device 200 may determine that the fireman 115-4 may have accurate information regarding the "best route" based on the information detected from the speech 422. In addition, in this example, since the fireman 115-4 has an expected expertise score of '4', which is higher than the expected expertise scores of '−2' and '2', respectively of the building manager 115-2 and the fireman 115-3, the electronic computing device 200 may provide a visual or audio output indicating to the fire commander 115-1 to ask the fireman 115-4 to talk on the group call. In some embodiments, when the talk group 401 is implemented as a half-duplex call, the electronic computing device 200 may automatically prioritize granting a talk group floor to the fireman 115-4 who has a higher expected expertise score than the building manager 115-2 and the fireman 115-3.

As shown in FIG. 4B, in response to receiving a notification 445 from the electronic computing device 200, the electronic computing device 200 detects a speech 460 from the fire commander 115-1. In the speech 460, the fire commander 115-1, based on the notification 445 received from the electronic computing device 200, seeks response from the fireman 115-4. In response, the fireman 115-4 informs (i.e., via speech 465) the fire commander 115-1 that the "south door" is the emergency route based on the floor plan downloaded by the fireman 115-4. At this point, the electronic computing device 200 validates 470 the information in the speech 465 based on floor plan information independently obtained from a verified source. The electronic computing device 200 further updates the expected expertise score of the fireman 115-4 when the information included in the speech 465 is verified. For example, as shown in FIG. 4, the electronic computing device 200 updates the expected expertise score from '4' to '6' at time 'T3' based on the validation of the fireman's 115-4 speech 465. In response, the fire commander 115-1 may command (i.e., via speech 475) the fireman 115-3 to proceed through the "south door" as informed by the fireman 115-4. The fireman 115-3 then acknowledges (i.e., via speech 480) the fire commander's command. At this point, at time 'T3', the electronic computing device 200 may further update the demonstrated expertise scores of the participants in the talk group 401. For example, as shown in FIG. 5, the demonstrated expertise scores of the building manager 115-2, fireman 115-3, and fireman 115-4 at time 'T3' are updated in the database 500 as '−2', '0.6', and '3', respectively. Accordingly, the electronic computing device 200 re-computes the group expertise score of the talk group 401 as '1.6'. Since, in this case, the group expertise score is higher than the threshold, the electronic computing device 200 updates 485 the threshold compliance indicator field 550 corresponding to 'T3' as 'NO'. The electronic computing device 200 then continues to monitor the communications transmitted between the participants in the talk group 401. The electronic computing device 200 may determine additional call contexts for which decisions may need to be made by participants in the talk group 401. Accordingly, the electronic computing device 200 repeats the process 300 and continues to evaluate the expertise of the participants in the talk group 401 as the call progresses and additional call contexts are determined.

As should be apparent from this detailed description, the operations and functions of the computing devices described herein are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., among other features and functions set forth herein).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The disclosure is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element preceded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through an intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method of evaluating the expertise of participants during a group call, the method comprising:
   analyzing, at an electronic computing device, via a natural language processing engine, speech content transmitted between communication devices of participants on a group call to determine a call context associated with the group call;
   obtaining, at the electronic computing device, a participant profile corresponding to each of the participants on the group call;
   assigning, at the electronic computing device, for each of the participants, an expected expertise score by correlating the call context with the participant profile;
   assigning, at the electronic computing device, for each of the participants, a call participation score based on a duration of time that the participant has spoken during the group call;
   determining, at the electronic computing device, for each of the participants, a demonstrated expertise score as a function of the expected expertise score and the call participation score of the participant; and
   detecting, at the electronic computing device, based on analyzing the speech content via the natural language processing engine, that a decision is being made with respect to the call context, and responsively providing a visual or audio output on a corresponding visual or audio output device indicating the demonstrated expertise score of at least one of the participants.

2. The method of claim 1, further comprising:
   determining a group expertise score of the participants on the group call based on aggregating the demonstrated expertise score of each of the participants; and
   determining whether the group expertise score is lower than a group expertise score threshold in response to detecting that the decision is being made with respect to the call context.

3. The method of claim 2, further comprising:
   determining that the group expertise score is lower than the group expertise score threshold, and
   wherein providing the visual or audio output comprises providing an indication at the communication device of at least one of the participants that the group expertise score is lower than the group expertise score threshold.

4. The method of claim 1, further comprising:
   updating, at the electronic computing device, the expected expertise scores of the participants based on a validation of respective speech content of the participants against a corresponding verified content.

5. The method of claim 4, wherein updating comprises:
   increasing the expected expertise score when the validation indicates that the speech content is consistent with the corresponding verified content, or
   lowering the expected expertise score when the validation indicates that the speech content is inconsistent with the corresponding verified content.

6. The method of claim 1, wherein providing a visual or audio output comprises:
   identifying a particular one of the participants responsible for making the decision during the group call; and
   providing the visual or audio output on a corresponding communication device associated with the particular one of the participants, the visual or audio output indicating the demonstrated expertise score of at least one of the participants.

7. The method of claim 1, wherein the visual or audio output includes an identification of all participants with demonstrated expertise scores lower than a demonstrated expertise score threshold.

8. The method of claim 1, wherein the visual or audio output includes an identification of a particular one of the participants with the demonstrated expertise score higher than the demonstrated expertise scores of all the other participants.

9. The method of claim 1, further comprising:
   assigning a floor grant priority to each of the participants as a function of the expected expertise score or the demonstrated expertise score respectively associated with each of the participants.

10. The method of claim 1, further comprising:
selecting a particular one of the participants with the expected expertise score higher than the expected expertise scores of the other participants and with the call participation score lower than the call participation scores of the other participants; and
assigning a floor grant priority to the particular one of the participants, such that the assigned floor grant priority is higher than floor grant priorities respectively assigned to the other participants.

11. The method of claim 1, further comprising:
identifying a particular one of the participants with the demonstrated expertise score lower than the demonstrated expertise scores of all the other participants; and
providing the visual or audio output on a corresponding communication device associated with the particular one of the participants, the visual or audio output indicating the demonstrated expertise score of the particular one of the participants.

12. The method of claim 1, wherein the duration of time based on which the call participation score is assigned does not include a time period during which no speech content is transmitted from the communication device of the participant or a time period during which the speech content transmitted from the communication device of the participant does not correlate with the determined call context.

13. The method of claim 1, wherein the call context includes information related to a public-safety incident and further wherein detecting that the decision is being made comprises:
determining, from the speech content, via the natural language processing engine, one or more keywords related to assignment of one or more tasks to be performed in relation to the public-safety incident.

14. An electronic computing device, comprising:
a transceiver; and
an electronic processor communicatively coupled to the transceiver, wherein the electronic processor is configured to:
analyze, via a natural language processing engine, speech content transmitted between communication devices of participants on a group call to determine a call context associated with the group call;
obtain a participant profile corresponding to each of the participants on the group call;
assign, for each of the participants, an expected expertise score by correlating the call context with the participant profile;
assign, for each of the participants, a call participation score based on a duration of time that the participant has spoken during the group call;
determine, for each of the participants, a demonstrated expertise score as a function of the expected expertise score and the call participation score of the participant; and
detect, based on analyzing the speech content via the natural language processing engine, that a decision is being made with respect to the call context, and responsively provide, via the transceiver, a visual or audio output on a corresponding visual or audio output device indicating the demonstrated expertise score of at least one of the participants.

15. The electronic computing device of claim 14, wherein the electronic processor is configured to:
determine a group expertise score of the participants on the group call based on aggregating the demonstrated expertise score of each of the participants; and
determining whether the group expertise score is lower than a group expertise score threshold in response to detecting that the decision is being made with respect to the call context.

16. The electronic computing device of claim 15, wherein the electronic processor is configured to:
determine that the group expertise score is lower than the group expertise score threshold; and
provide, via the transceiver, an indication at the communication device of at least one of the participants that the group expertise score is lower than the group expertise score threshold.

17. The electronic computing device of claim 14, wherein the electronic processor is configured to:
identify a particular one of the participants responsible for making the decision during the group call; and
provide, via the transceiver, the visual or audio output on a corresponding communication device associated with the particular one of the participants, the visual or audio output indicating the demonstrated expertise score of at least one of the participants.

18. The electronic computing device of claim 14, wherein the electronic processor is configured to:
assign a floor grant priority to each of the participants as a function of the expected expertise score or the demonstrated expertise score respectively associated with each of the participants.

19. The electronic computing device of claim 14, wherein the electronic processor is configured to:
select a particular one of the participants with the expected expertise score higher than the expected expertise scores of the other participants and with the call participation score lower than the call participation scores of the other participants; and
assign a floor grant priority to the particular one of the participants, such that the assigned floor grant priority is higher than floor grant priorities respectively assigned to the other participants.

20. The electronic computing device of claim 14, wherein the electronic processor is configured to:
determine that the call context includes information related to a public-safety incident; and
determine, from the speech content, via the natural language processing engine, one or more keywords related to assignment of one or more tasks to be performed in relation to the public-safety incident.

* * * * *